Oct. 20, 1953     H. W. TEMPLETON     2,655,872
VEHICLE STRUCTURE

Filed Nov. 9, 1948     5 Sheets-Sheet 1

Inventor
Herbert W. Templeton

Patented Oct. 20, 1953

2,655,872

UNITED STATES PATENT OFFICE 2,655,872

VEHICLE STRUCTURE

Herbert W. Templeton, Detroit, Mich., assignor to Fairmont Railway Motors, Inc., Fairmont, Minn., a corporation of Minnesota Application November 9, 1948, Serial No. 59,159

12 Claims. (Cl. 105—215)

This invention relates generally to improvements in vehicle structures, but relates more particularly to improvements in structures adapting the vehicle to travel upon either the highway or upon a railway track, and it consists of the matters hereinafter described and more particularly pointed out in the appended claims.

One of the objects of the present invention is to provide an improved structure as a part of a road vehicle, such for example as an automotive vehicle, whereby the same may travel either on the road or on a railway track.

Another object of the invention is to provide an improved structure adapted to be applied to a conventional road vehicle, such for example as an automobile, whereby the vehicle may travel safely either upon the road or upon a railway track.

Again, it is an object of the invention to provide structure in combination with the vehicle axle wheel and frame of a road type vehicle, pilot means which when the vehicle is traveling on rails will normally maintain a portion of the pilot means below the top of the rail, regardless of the normal variations in the position of the vehicle wheel, axle and frame.

A further object of the invention is to provide in a road-rail vehicle having an axle and road wheels, a guide means suspension structure, including guide flange means suspended in close proximity to, but normally out of contact with, the rails when the vehicle is traveling on the rails and serving to guide the vehicle wheels on the rails, the suspension arrangement being such that in the event said guide flange means engage either rail, due to a lateral shifting of the vehicle axle, the tendency of the guide flange means to climb the rail will be resisted by the total load on the vehicle wheels.

Another object of the invention is to provide a structure of this kind, which includes a novel linkage arrangement for locking the pilot members against movement when the vehicle is running upon a railway track and which arrangement may be quickly and positively actuated by the operator to dispose the pilot members in position permitting use of the vehicle on a roadway.

The above mentioned objects of the invention, as well as others, along with the advantages thereof, will more fully appear as the specification proceeds.

In the drawings:

Fig. 1ᵃ is a fragmentary view of a part of the rail and a part of the pilot wheel better showing the preferred contour of the pilot wheel flange, the pilot wheel being shown in its normal out of rail contact position and indicating how any thrust of the pilot wheel flange against the rail would tend to cause the pilot wheel to climb upwardly on the rail.

Fig. 2 is a longitudinal vertical section through the front end part of the vehicle structure appearing in Fig. 1, as taken on the line 2—2 thereof.

In general the structure embodying the invention as illustrated is designed for application to a conventional type of automotive road vehicle wherein the chassis is spring-supported from the front and rear axles of the vehicle, which carry the pneumatic tired wheels designed to travel upon a road or highway and which vehicle may be quickly converted for travel upon the rails of a railway track. This may be for permanent use or for temporary use between periods of road use. However, it should be understood that the structure shown is by way of illustration and not necessarily by way of limitation.

The improved illustrated structure includes front and rear sets of longitudinally extending rigid or inflexible arms, which are mounted to swing upwardly or downwardly, on axes parallel with the associated front and rear axles of the vehicles, as conditions may require, but cannot shift lengthwise of said axles. The arms of each set carry associated lateral reaction guide or pilot members, one for each arm and preferably each in the form of a wheel including a radial flange and a tread, with the latter each disposed in line with an adjacent vehicle wheel.

When the structure is in condition for rail travel, the treads of the guide members or pilot wheels are disposed slightly above and out of contact with the rails and the flanges are spaced adjacent to but laterally of and preferably inside the rails, and with at least a portion of the flanges extending below the top of the rails.

The sets of arms are operatively connected by a linkage structure with suitable hydraulic mechanism, which is actuated by the driver of the vehicle, either to lock the arms rigidly in the "down" position for rail use of the vehicle or in the "up" position for road use.

In the normal operation of the vehicle upon the rails of a railway track, the arms that support the pilot wheels are "down" and the treads of the guide members or pilot wheels are disposed above and out of contact with the rails. The flanges of said wheels are spaced laterally from the inside of the rail and out of contact therewith, with the bottom portions of the flanges extending below the top of the rails. Thus the flanges of the pilot wheels will only engage the rails in the event the vehicle axles shift laterally of the rails, in which event the tendency of the flange to react laterally and climb the rail is resisted by load on the associated vehicle wheels. This latter effect is obtained by means which prevent the arms carrying the guide members or pilot wheels from rocking about their pivotal connection with the vehicle axles.

These arms include substantially upright secondary arms or posts, each connected to a horizontally disposed, functionally rigid member pivotally connected at one end to the top of the secondary arm and at the other end pivotally connected to an associated upstanding bracket on the vehicle frame.

The functionally rigid members mentioned are in the form of extensible and retractible cylinder and piston combinations and associated features, to which cylinders hydraulic fluid may be admitted at one end and discharged from the other end. Thus, these members may be extended or retracted in length and may be locked in either of these conditions by means of the fluid in the cylinder and system.

In the event of a sudden deflation, such as a blowout of a tire on an associated wheel, or some other abnormal condition, permitting the vehicle to settle or lower downwardly, the pilot wheel tread will engage and roll upon the rail and will then support the load of the vehicle, in whole or in part.

However, so long as the pneumatic tires of the vehicle are properly inflated and the vehicle is carrying its normal load, no part of the load is carried by the pilot wheels, which as before mentioned, are out of contact with the rails. Hence, as the vehicle passes over the rails, it is quiet in operation and the function of the pilot wheels is simply to prevent the vehicle wheels from shifting laterally far enough to get off or leave the rails.

When it is desired to use the vehicle as a road vehicle, the hydraulic system, which raises, lowers and holds the pilot wheel arms either raised or lowered, is manipulated to cause said arms to be swung upwardly so that the bottom portions of the pilot wheel flanges are disposed at an elevation above the top of the rails. The hydraulic system is then manipulated to hold the arms in this position. When the pilot arms are again lowered for the rail use of the vehicle, definite stop means are provided to limit the movement of said arms so that no load is imposed upon the pilot wheels, when the vehicle is in rail use.

Figure 1:
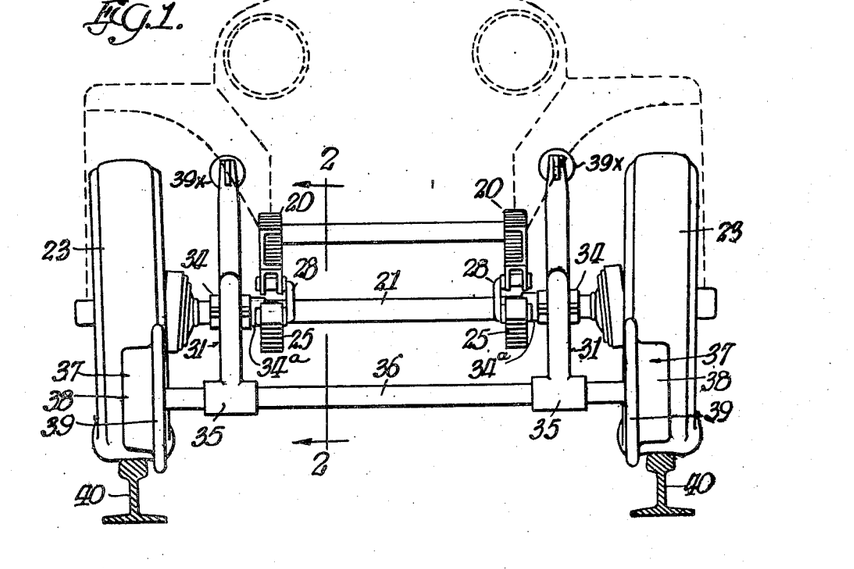
Fig. 1 is a view in front end elevation of a vehicle structure embodying the preferred form of the invention.

Referring now in detail to that embodiment of the invention illustrated in Figs. 1, 1ª, 2 and 3, only the chassis of an automotive vehicle appears therein, and which includes laterally spaced side frame members 20—20 that are cross connected in any conventional manner. Below and extending transversely of said side frame members are the front and rear axles 21 and 22 (see Figs. 2 and 3) upon each end of which is operatively mounted front and rear pneumatic tired wheels 23 and 24 respectively. Operatively connected to the front and rear axles are the sets of front and rear springs 25 and 26 respectively which support the side members 20 of the vehicle frame by means of brackets 27 and shackles 28 respectively. The vehicle structure thus far described is conventional in certain types of automotive vehicles, driven by an engine in the usual manner and disposed under the hood 29, shown in dotted lines in Figs. 1 and 2.

Figures 3, 4, 5:
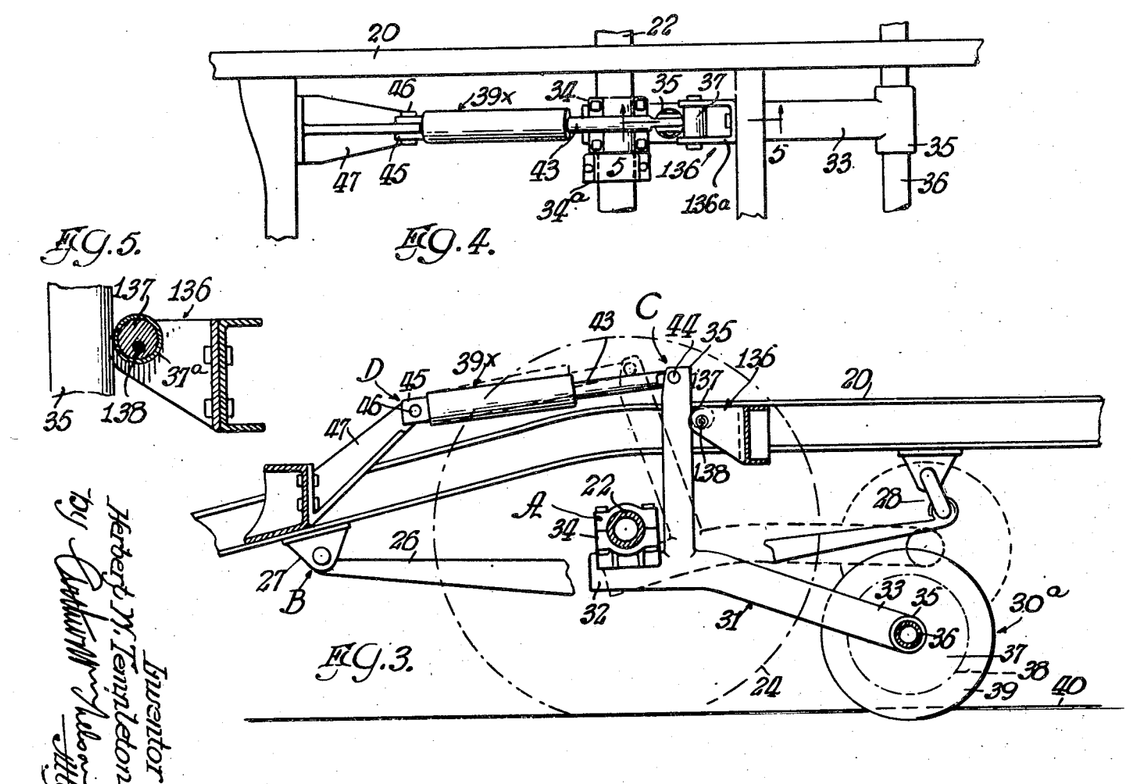
Fig. 3 is a view similar to Fig. 2, illustrating the associated structure at the rear end of the vehicle.
Fig. 4 is a top plan view of parts appearing in Fig. 3.
Fig. 5 is a detail vertical sectional view through certain of the parts shown in Fig. 4 as taken on the line 5—5 thereof and on a scale enlarged thereover.

Extending forwardly from the front axle and rearwardly from the rear or back axle are pilot wheel supporting structures, each indicated as a whole in Figs. 2 and 3 by the numerals 30 and 30a respectively. These structures are substantially alike and therefore a detailed description of the structure at the front of the vehicle, as appears in Figs. 1 and 2, will suffice for the structure at the rear of the vehicle, similar parts bearing the same reference numerals.

The front pilot wheel supporting structure 30 embodies a pair of laterally spaced, longitudinally extending arms 31—31, each arranged in a plane between a side frame member 20 and the front wheels of the vehicle associated therewith. Each arm is preferably made of metal tubing, bent to form a substantially rear end part 32 and a downwardly and forwardly extending front end part 33. The rear end arm part has fixed thereto a bearing block 34, which is of the split type for operative attachment to the axle of the vehicle, and this in a manner providing a pivotal connection between each arm of the structure and said axle and whereby the structure is capable of an up and down swinging movement about the axle as an axis. Thrust collars 34a, one of which best appears in Fig. 4, are provided to prevent movement of the bearing blocks 34 longitudinally of the associated axle 21 or 22.

The front end of the portion 33 of each arm carries a transversely extending sleeve 35 and these sleeves surround, are secured to, and jointly support a pilot wheel axle 36, which is preferably tubular.

Rotatively mounted on the ends of the axle 36 are lateral reaction guides in the form of pilot wheels 37, each of which includes an annular tread 38 and a radial flange 39. The pilot wheels are so spaced on the axle that the treads 38 thereof overhang the rails 40 of a railway track, with the flanges 39 arranged inwardly from and out of contact with said rails, as best appears in Figs. 1 and 1ª.

Fixed to and extending upwardly from the upper side of the portion 32 of each arm 31, where it joins the associated portion 33, is an upstanding post or secondary arm 35 and to the upper end of which power is applied for the purpose of swinging the arms 31 from the operative position for rail use of the vehicle shown in full lines in Fig. 2, to the inoperative position for road use of the vehicle shown in dotted lines in said Fig. 2.

To limit the downward movement of the arms into the full line position shown in Fig. 2, a stop mechanism 136 is provided for each arm 35. Each stop mechanism which is carried by the vehicle frame, includes a U-shaped bracket 136a between the arms of which is operatively secured a cylinder 137, by means of a bolt 138 that passes through the bracket and eccentrically through the cylinder. A sleeve 137a (see Fig. 5) is rotatively mounted on the cylinder and provides an antifriction engagement for the associated arm 35 in its vertical movement during normal vertical movement of the vehicle. By turning the cylinder on the bolt, different parts of the cylinder 137 and its sleeve 137a may be faced toward the associated arm 35 to afford an adjustment whereby the intended or operative position of each arm 31 may be readily attained. Fig. 5 best shows one of the structures just mentioned. After the cylinder 137 has been adjusted to the desired position on the bolt 138, said bolt is tightened up and this causes the sides of the bracket 136a to clamp against the ends of the cylinder. While this clamping action prevents the turning of the cylinder on the bolt, it does not prevent the turning of the sleeve 137a on the cylinder.

Figure 10:
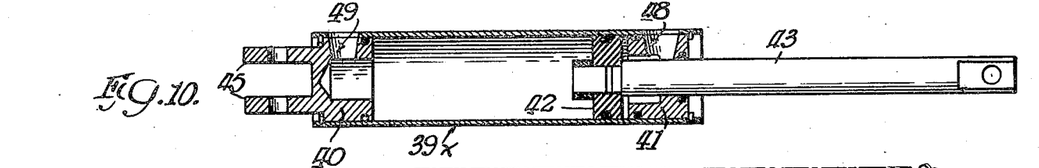
Fig. 10 is a longitudinal vertical sectional view, on an enlarged scale, through one of a number of hydraulically actuated cylinders employed in the improved structure.

Associated with the secondary arm 35 of each arm 31 is an hydraulic apparatus that includes a cylinder 39x having end closures 40 and 41 respectively and slidable in the cylinder is a piston 42 fixed on one end of a piston rod 43 that has a packed sliding bearing through the closure 41. The other end of the piston rod is pivotally connected to the upper end of the associated arm 35 by a cross pin 44. The other closure 40 is provided with spaced extension ears 45, which receive between them the upper end of a bracket 47 rising from a part of the chassis frame of the vehicle. A pin 46 is provided to form a pivotal connection. Each cylinder 39x and end closures 40 and 41 are provided with ports 48 and 49 respectively (see Fig. 10), which alternately form the inlets and outlets for hydraulic fluid under a nominal pressure and whereby the piston and its rod can be longitudinally extended or retracted relative to the cylinder. There are four of such hydraulic cylinders and piston rods, arranged with two thereof associated with the pilot wheel supporting arms 31 at the front of the vehicle and with the other two thereof associated with the pilot wheel supporting arms 31 at the rear of the vehicle. The piston rods of the cylinders 39x at the front of the vehicle are directed forwardly and the piston rods of the cylinders 39x at the rear of the vehicle are directed rearwardly, as best appears in Figs. 1, 2 and 12 respectively, the latter figure diagrammatically illustrating the hydraulic fluid flow circuit or system of the structure.

Figures 11, 12:
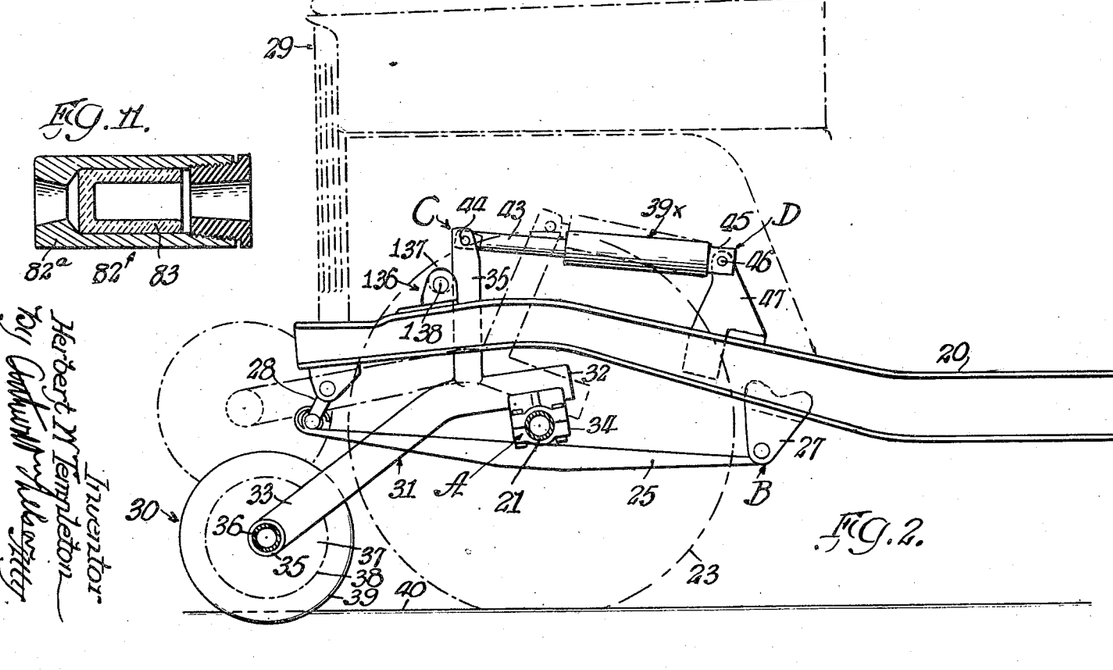
Fig. 11 is a longitudinal vertical sectional view on an enlarged scale through a certain pressure gauge snubber employed in the structure and which will be more fully referred to later.
Fig. 12 is a diagrammatic view illustrating the hydraulic circuit or system and controls therefor embodied in the improved vehicle structure.
Figure 12:
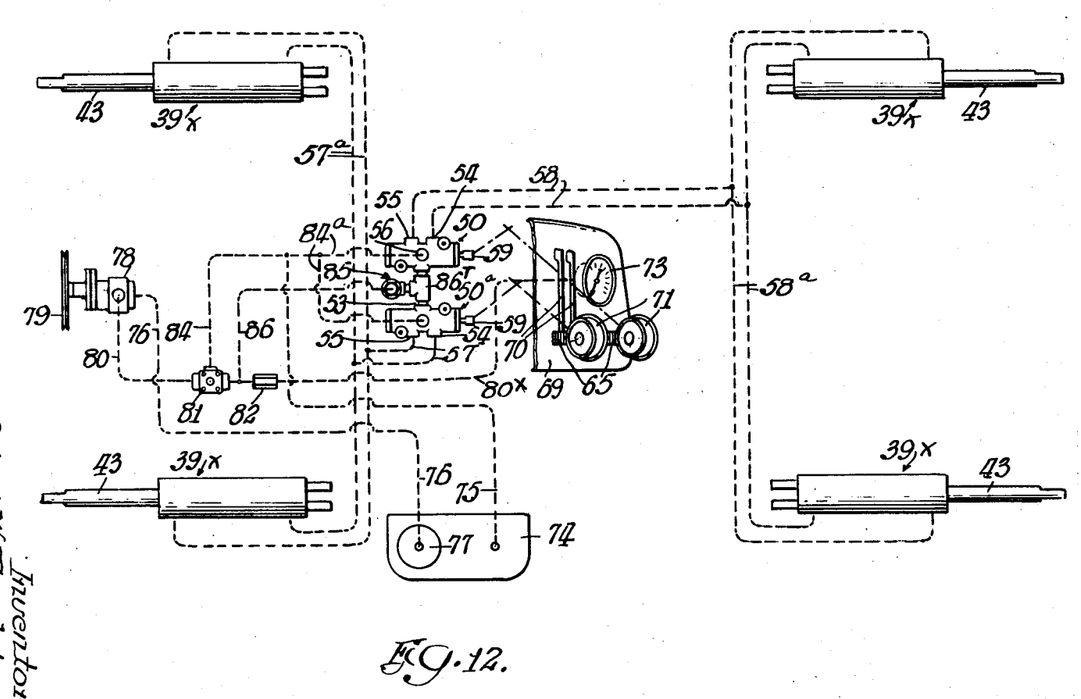

As best appears in Fig. 12, there is a four-way selector valve 50 associated with the pair of cylinders and pistons 39x—43 at the front of the vehicle and a second four-way selector valve 50a associated with the pair of cylinders and pistons 39x—43 at the rear of the vehicle. These valves are disposed in an upright side-by-side position on the front face of the fire wall 51 of the vehicle, as appears in Figs. 6, 7 and 8.

Each valve 50—50a includes a casing 52 having an hydraulic fluid inlet port 53 in one side between its ends and a pair of alternately acting return and discharge ports 54—55 in its opposite side. In a third side of each casing is another port 56. The ports 54—55 of each valve are connected by high pressure flexible tubing 57, 57a and 58, 58a respectively with the ports 48 and 49 of the associated cylinders 39x, as best appears in Fig. 12. The tubings 57, 57a and 58, 58a, as well as others employed in the hydraulic circuit, are indicated by dotted lines in said Fig. 12.

Slidable in each valve casing is a piston type valve 59 which is manually shiftable by the operator from one position to the other, to cause a raising or lowering of the pilot wheel supporting arms.

Figures 6, 7, 8, 9:
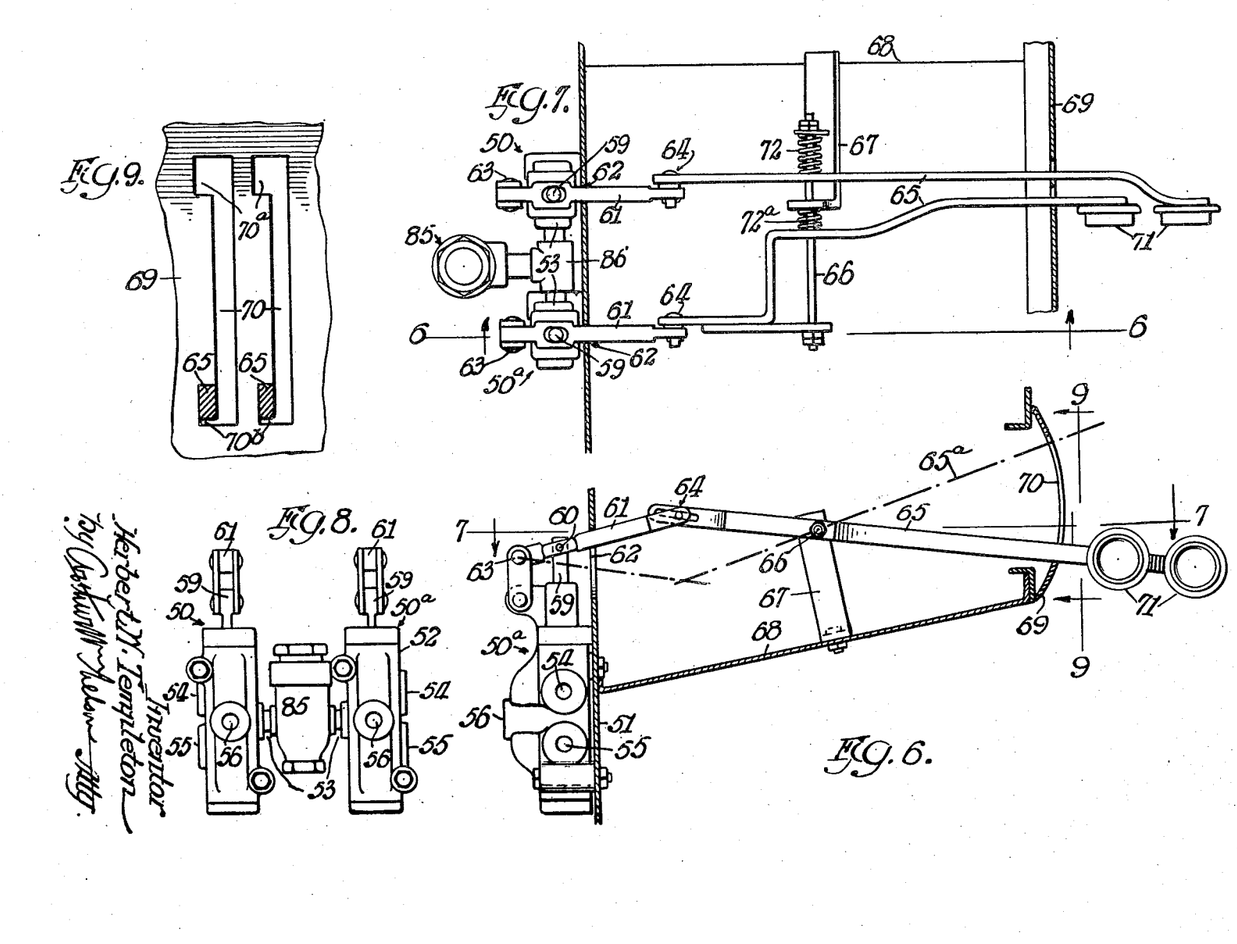
Fig. 6 is a vertical detail sectional view through parts at the front of the driver's compartment of the vehicle as taken on the line 6—6 of Fig. 7, and more particularly shows mechanism for manually operating the hydraulic control for raising and lowering the pilot members of the structure.
Fig. 7 is a horizontal sectional view, as taken on the line 7—7 of Fig. 6.
Fig. 8 is a view in elevation of the control cylinders at the left hand end of Fig. 6.
Fig. 9 is a vertical detail sectional view through parts appearing in Fig. 6 as taken on the line 9—9 thereof, on a scale enlarged thereover, and which will be more fully referred to later.

The upper end of each piston valve 59 is made as a stem which is pivotally connected as at 60 to a mid portion of a lever 61 that extends through an associated upright slot 62 in the fire wall 51 of the vehicle, as in Fig. 6. The front end of this lever has a pivoted link connection 63 with the casing 52 of the associated valve cylinder. The rear end of this lever has a pin and slot connection 64, with the front end of an operating lever 65, and which is pivoted on a shaft 66 supported by a bracket 67 rising from a substantially horizontal panel 68, extending between the fire wall and a second and substantially upright panel 69 spaced rearwardly from the fire wall. Said wall and said panels form a part of the vehicle at the front of the driver's compartment thereof, to which the apparatus is applied.

The rear end of each lever 65 projects through an associated upright slot 70 in the panel 69 and this slot is provided at its ends with top and bottom lateral extensions 70a and 70b respectively, as best appears in Fig. 9. The extreme rear end of each lever 65 carries a knob 71 for convenience in operating the lever and one lever 65 is longer than the other so that the knobs thereof are longitudinally offset for a better grasping thereof, as appears in Figs. 6 and 7.

When the levers are pressed downwardly, this will, through the levers 61, pull the piston valve 59 of the cylinder 52 upwardly to one limit of movement and when said levers 65 are swung upwardly, this will, through the levers 61, push the piston valve 59 downwardly to the other limit of movement.

The levers 65 are limited in their upward and downward swinging movement by the length of the slots 70, through which they extend, and they are releasably locked in either limit of movement by their engagement in the lateral extensions 70a—70b of said slots 70. Springs 72—72a (see Fig. 7) are so mounted on the axis shaft 66 for said levers as to urge them laterally toward that side of the respective slots 70 having the extensions 70a—70b so as to enter said extensions and be releasably locked against swinging movement in said slots. In Fig. 9, the levers 65 are shown as disposed in the lateral extensions 70b of said slots so that the upper ends of said extensions act as shoulders stopping any upward movement of said lever. To swing said levers upwardly the operator moves them laterally out of said slot extensions against the action of the springs 72—72a into the bottom of the slots and then lifts upwardly on said levers until they reach the top of the slot. When said lever is released, said springs function to swing the levers laterally into the extensions 70a at the top end of said slots.

On the wall 69 adjacent the slots 70 is located a pressure gauge 73 (see Fig. 12) for indicating the pressure of the hydraulic fluid in the system thereof.

The hydraulic system includes a reservoir 74, to which are connected branch conduits 75 and 76, the former being the inlet to the reservoir and the latter being the outlet from the reservoir and leading off from a filter 77 therein.

The conduit 76 leads to the inlet side of an hydraulic fluid circulating pump 78 provided with a pulley 79 for driving the same and which in turn may be driven either from the engine (not shown) of the vehicle or independently thereof. A conduit 80 from the pump, leads to a pressure relief valve 81 and then to the inlet of a check valve 85 by means of a conduit 86. The gauge 73 is on a conduit 80x leading off from the conduit 86 and a gauge snubber 82 is located in said conduit 80x.

The principal purpose of the pump, which is of the rotary gear type, is to supply a quantity or volume of hydraulic fluid to the cylinders 39x and not to provide any substantial pressure head. The pressure required is only that necessary to lift the weight of the pilot arms 31, axles 36 and wheels 37 and to again lower them to the operating position of the pilot wheels, which is not great.

The pump draws fluid from the reservoir 74 through the filter and delivers it into the conduit 80 and the pressure relief valve 81 therein. In practice this valve is set initially to 200 p. s. i. and the entire circuit or system will withstand momentary pressures up to 1000 p. s. i.

The snubber 82 is shown in longitudinal section in Fig. 11 and it includes a tubular casing body 82a, in which is located a body 83 of porous material. The function of the snubber is to absorb shock loads due to pressure variation in the conduit 80 to provide a more uniform position of the indicator hand in the gauge 73 and to protect the mechanism thereof against damage.

Conduit 84 is a bypass one from the relief valve 81 and leads to a connection with the conduit 75 that leads to and is connected to the inlet side of the reservoir 74. Ports 56 of the selector valves 50—50a are connected by conduits 84a to conduit 75 for the return of fluid to the reservoir 74. The outlet side of valve 85 is connected by a T fitting 86T (see Fig. 12) with the ports 53 of both valve casings 52.

In the operation of the structure, the levers 65 are swung to the bottom end of the slots 70, as shown in full line in Fig. 6, to lower the pilot arms 31 for rail use of the vehicle and said levers are swung upwardly to the top end of the slots 70, as indicated by the dot and dash line 65a in Fig. 6, for the road use of the vehicle.

Figure 1A:
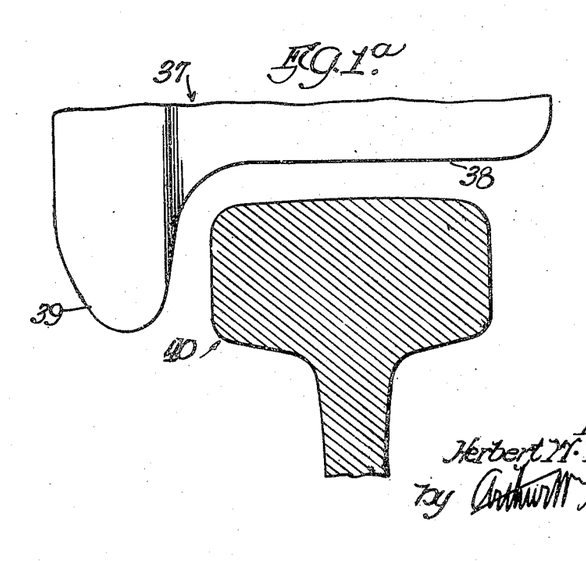

When the levers 65 are disposed in the lower end of the slots 70 this shifts the piston valve 59 of each selector valve 50—50a upwardly to connect the port 53 of each selector valve with the port 54 thereof and to connect the port 55 thereof with the port 56 of the same valve. Fluid thus enters the ports 49 of the cylinders 39x and this forces the piston rods 43 of said cylinders outwardly. This extends the length of the cylinder and piston rod so that the pilot wheel arms 31 are swung downwardly until the associated secondary arms 35 engage with its adjustable stops 136. The stop has been set or adjusted to a position which limits the movement of the arms 31 so that the pilot wheels 37 are positioned with the bottom portions of the flanges 39 thereof below the top of the rails 40, as appears in Figs. 1 and 1a and in full lines in Figs. 2 and 3. At the same time, it will be observed that the tread portions 38 of the pilot wheels do not engage the rail.

When the cylinders and the piston rods are in the extended position described in the previous paragraph, the pump 78 develops the 200 p. s. i. pressure setting of the relief valve 81 and the fluid is thereby passed through the balanced piston of this valve back to the reservoir, through conduits 84 and 75.

The check valve 85, which is located in the conduit 86 is ahead of the fitting 86T and it functions for both selector valve casings 52 and has the important function of making the cycle irreversible. In other words, when the guide flanges 39 of the pilot wheels meet a thrust load in their operative position, this thrust load is transmitted through the arms 31 to the associated hydraulic cylinders 39x tending to shorten or collapse them. However, because the incompressible column of hydraulic fluid in the cylinder is locked in the circuit by the check valve 85, there is no movement of the piston rod in the cylinder. Thus, any upward component of a thrust force on the guide flange of any pilot wheel, as said flange tends to climb the rail, is counteracted by the entire weight carried by any one axle and the pair of associate vehicle wheels. Thus the entire weight carried by any one axle and pair of vehicle wheels is effective in resisting the thrust of either one of the associated guide flanges. In this respect, the vehicle axle can be considered as a rigid beam, loaded at each spring seat. The weight carried by the end of the axle nearest the flange under thrust contributes the greatest resistance but there is also a certain amount of resistance offered by the weight carried by the other spring seat.

When the levers 65 are swung upwardly to raise the arms 31—31, this operates to depress the valve 59 of the selector valves 50—50a so that the inlet ports 53 of said valves are connected to the port 55 thereof and port 54 communicates with port 56 of the same valve.

Thus, hydraulic fluid then enters the port 48 of each cylinder 39x and retracts the piston rod 43 thereof so that the arms 31 are swung into the inoperative raised position indicated in dotted lines in Figs. 2 and 3, being held in this position against swinging downwardly under the action of gravity by the columns of fluid in the cylinders and which are locked therein by reason of the check valve.

It is obvious that while there is 200 p. s. i. in each cylinder, no pressure is required in the cylinders to maintain the pilot wheel in this operative position so long as a volume of fluid is assured by the pump through the check valve.

In the event of a failure in the pump, the vehicle is still safe for rail or road operation because the check valve 81 retains the fluid in the locking circuit.

Assume that the arms 31 are in the full line position for a rail travel of the vehicle. When the flange 39 of one of the pilot wheels engages the rail in the course of guiding its associated vehicle wheel tire, there is a force exerted on the rail due to the inertia and centrifugal force of the vehicle. The horizontal (transverse) component of this force is transmitted through the suspension arm 31 to the thrust collar 34a on the vehicle axle (21 or 22 as the case may be) and thus to the vehicle tire, maintaining it in correct alignment on the rails. The vertical component of this force acts upon the suspension arm 31 and exerts a turning movement about its pivotal connection with the axle. The rigid link effect produced by the now locked together cylinder and piston 39x—43 counteracts this by an equal and opposite moment, preventing said turning movement. Until the vertical thrust component upward reaches the value of the vehicle weight downward upon the vehicle wheel, equilibrium is maintained. When this upward force exceeds the weight on the vehicle wheel, it is transmitted through the vehicle spring to the frame, resulting in upward movement. It should be noted that except for the weight of the guide flange suspension assembly and vehicle running gear, all of the weight either transferred to or from the guide flange is transmitted through the vehicle springs. Thus, the entire vehicle weight and inertia forces carried by any vehicle wheel is available to the corresponding guide flange when it is required. This transfer of forces is automatic and self-equalizing. As the vehicle enters a curve the guide flange 39 of the pilot wheels 37 must overcome all of the inertia, friction, and other forces resisting change of motion. The upward component of any definite thrust value unloads the vehicle tire a proportionate amount, and the sum of flange load and vehicle tire load equals the total force (weight) downward. This process of weight transfer to the guide flange as required is continuous and varying, and leaves a maximum of weight available on the vehicle tires for traction and braking.

The pilot or guide means suspension arms are rigidly connected to the cross member on which the pilot means rotate, but as has been described, said arms are pivotally connected to the vehicle wheel suspension means or axle. This is important inasmuch as it is an object of the invention always to maintain the flange of the guide means below the top of the rail in normal operation regardless of the position of the vehicle wheel, axle and frame. If the connection to the vehicle axle were rigid, the guide flange would move up and down with respect to the rail an amount corresponding exactly to the movement of the vehicle wheel. Also, if the guide wheel only was moved upward a twisting of the vehicle axle would result, causing an S deformation of the spring. Hence even if this pivotable connection to the vehicle axle were not utilized to attain retraction of the guide wheels, it would still be necessary to accomplish the desired mechanical action of the suspension linkage.

By means of the structure described, the pilot wheel arms may be readily caused to dispose the pilot wheels in either the position for rail use of the vehicle, or for road use and are positively held in either position by the hydraulic fluid in the circulatory system.

If the pilot or guide member suspension system is applied to an existing vehicle, as herein described, points A and B are predetermined. Points C and D then must be selected with respect to points A and B so that the pilot or guide member is maintained in constant relationship to the rail under all operating conditions. The collapsible link between the control arm pivot at points C and D is approximately horizontally disposed so that it transmits, or resists, horizontal forces only.

Under varying weight and centrifugal forces the axle pivot at point A will vary slightly in a vertical direction due to the deflection of the vehicle tire and a limited amount horizontally due to change in spring length. Because the pivot points A and C are fixed with relation to each other, point C will also move in proportion to point A. These movements are very slight and can, in some instances, be neglected by comparison and when they become of accountable proportion, can be compensated for by proper selection of the pivot points.

Pivot points D and B will move vertically a considerable amount under varying load conditions. The ratio of the distance between points C and D to the vertical movement of point D is made as large as possible within the physical limits of the linkage. Thus the angular displacement of the link between points C and D is small, and the tendency for the fixed length link to move point C about point A is reduced to a negligible amount. It can be readily observed from the drawings (see Fig. 2) that movement of point C towards point D would rotate the suspension arm assembly about point A, and lift the flange of the pilot or guide member away from the rail.

To further minimize any such movement, and in the form illustrated to reduce the internal stresses on the hydraulic cylinders, the fixed stop bracket 36 is placed forward of the control arm to correctly position it, and a continuous pressure is exerted on the piston 42 to hold the control arm 35 against this stop at all times during normal operation on the rails. When vertical movement of point D increases the distance between points C and D the link automatically and irreversibly increases in length to hold the control arm against the stop and maintain the suspension arm in the same position.

In this relative movement between points C and D, as point D continues to move downward, there is a progressive increase in distance between said points, which is taken up by the extension of the associated hydraulic cylinder and its rod. Because of the check valve 85 in the hydraulic fluid circuit, this extension is irreversible at normal operating pressures and at normal loads. As load is removed from the vehicle, point D attempts to move upwardly and there then occurs what may be termed a temporary "fight" or resistance, offered in a substantially horizontal direction, to this upward movement of point D by the incompressible column of fluid behind the cylinder. This resistance is partially alleviated or eased by the flexibility of the spring structure, associated spring eye bushings and mounting bushings of the brackets and shackles 27 and 28 respectively. Because the hydraulic pressure generated during this condition is above normal operating (still within design pressure) the remaining energy is dissipated by the expansion of the flexible fluid lines and by equalization of hydraulic pressure in the cylinder within a short period of time. Because these extension and collapse movements are extremely small by comparison to total movement and total volume, the operation is practical and has been proved by test.

It is obvious that there are many different types of mechanical devices, linkages, and servo units which can be applied between points C and D to effect retraction and to resist the moment of the upward thrust component to maintain the suspension arm in its constant position. Or, if retraction of the flange is not desired, a rigid link can be applied between points C and D.

As heretofore described, the pilot members 37 are mounted on the cross axle 36 and while this is preferable, it is possible, with the apparatus disclosed, to carry each pilot member independently on its associated arm 31.

Also, while the pilot member 37 is illustrated and described as a wheel having a tread 38 and a flange 39, certain of the advantages of the invention could be obtained by the use of a flange 39, alone and without any tread portion. For example, such a design could be used when the tires of the wheels 23, 24 are of puncture-proof type.

It will also be obvious that the load transfer through the pilot arm assembly is the same whether the pilot wheels are in advance of or are trailing the associated vehicle wheel.

While in describing the invention I have referred in detail to the form, arrangement and construction of the parts involved, the same is to be considered only in the illustrative sense and, therefore, I do not wish to be limited thereto except as may be specifically set forth in the appended claims.

I claim as my invention:

1. A vehicle for travel on railroad rails including a vehicle frame, transverse axle means, spring means supporting the frame upon the axle means, vehicle wheels mounted on opposite ends of the axle means, rigid guide supporting levers having end portions and being pivotally supported on said axle means intermediate said end portions, guides carried by one end portion of said levers and having vertical lateral reaction portions, means for rotating said levers about the axle means for raising the guides from and lowering them to normal operative guiding position with said reaction portions adjacent and extending below the top of the rail head but normally laterally of and out of contact with the rails, said rotating means being pivotally connected to the frame and to the other end portions of said levers at spaced pivotal points and being operative to vary the spacing of said points when lowering the guides to said guiding position and to unyieldably oppose rotation of said levers responsive to any lifting thrust exerted on the guides in the event the lateral reaction portions be shifted laterally into engagement with the rail, the relative positions of said pivotal points and of the pivotal connection of said levers with said axle means and the position of the guides on said levers being correlated to maintain substantially unchanged the operative guiding position of the guides during movements of the frame toward and away from said axle means.

2. A vehicle for travel on railroad rails including a vehicle frame, transverse axle means, spring means supporting the frame upon the axle means, vehicle wheels mounted on opposite ends of the axle means, rigid levers pivotally supported on said axle means, lateral reaction guides carried by said levers, said guides having vertical flange portions and tread portions, guide control means pivotally connected to said levers and to said frame at spaced apart pivotal points, means operative on said control means for varying the spacing of said pivotal points effective for rotating the levers to position the guides in guiding position with said tread portions spaced above the rail heads and the flange portions extending adjacent, above and below the rail heads but normally laterally of and out of contact with the rails and for rotating the levers to retract the guides from said guide positions, and means rendering the control means effective, when the guides are in guiding position to unyieldably oppose rotation of said levers responsive to a lifting thrust exerted on the guides in the event the lateral reaction portions be shifted laterally into engagement with the rail.

3. A vehicle for travel on railroad rails including a vehicle frame, transverse axle means, spring means supporting the frame upon the axle means, vehicle wheels mounted on opposite ends of the axle means, rigid guide supporting levers pivotally supported on said axle means, lateral reaction guides carried by said levers, said guides having vertical flange portions, guide control means pivotally connected to said levers and to said frame at spaced apart pivotal points, said guide control means controlling the rotative position of said levers to thereby position and maintain the guides in guiding position during vertical movements of the frame relatively to the axle means with said flange portions extending adjacent, above and below the rail heads but normally out of contact therewith and being further effective to unyieldably oppose rotation of said levers responsive to lifting thrusts exerted on the guides when the latter are in guiding position and are shifted laterally into engagement with the rail, the path of travel of the pivotal connection between the frame and said guide control means during vertical movements of the frame relatively to the axle means being so positioned relatively to the said pivotal connections between the levers and control means and the levers and axle means as to cause the control means to control the rotative position of the levers to maintain substantially unchanged the guiding position of the guides during the said vertical movements.

4. A vehicle for travel on railroad rails including a vehicle frame, transverse axle means, spring means supporting the frame upon the axle means, vehicle wheels mounted on opposite ends of the axle means, rigid guide supporting levers pivotally supported on said axle means, lateral reaction guides carried by said levers, said guides having vertical flange portions, guide control means pivotally connected to said levers and to the frame at substantially horizontally spaced apart pivot points, said guide control means controlling the rotative position of said levers to thereby position and maintain the guides in guiding position with said flange portions extending adjacent, above and below the rail heads but normally out of contact therewith and being further effective to oppose rotation of said levers responsive to lifting thrusts exerted on the guides when the latter are in guiding position and are shifted laterally into engagement with the rail, the path of travel of the pivotal connection between the frame and said guide control means during vertical movements of the frame relatively to the axle means being so positioned relatively to the said pivotal connections between the levers and control means and the levers and axle means as to cause the control means to control the rotative position of the levers to maintain substantially unchanged the guiding position of the guides during the said vertical movements.

5. A vehicle for travel on railroad rails including a vehicle frame, transverse axle means, spring means supporting the frame upon the axle means, vehicle wheels mounted on opposite ends of the axle means, rigid guide supporting levers having upper and lower end portions and being pivotally supported on said axle means substantially concentrically therewith and intermediate said end portions, lateral reaction guides carried by the lower end portions of said levers and having flange and tread portions, guide control means pivotally connected to the upper ends of said levers and to said frame at spaced apart pivotal points, means operative on said control means for varying the spacing of said pivotal points effective for rotating the levers to position the guides in guiding position with said tread portions spaced above the rail heads and the flange portions extending adjacent, above and below the rail heads and for rotating the levers to retract the guides from said guide positions, means rendering the control means effective when the guides are in guiding position to unyieldably oppose rotation of said levers responsive to a lifting thrust exerted on the guides, the path of travel of the pivotal connection between the frame and said guide control means during vertical movements of the frame relatively to the axle means being so positioned relatively to the said pivotal connections between the levers and control means and the levers and axle means as to cause the control means to control the rotative position of the levers to maintain substantially unchanged the guiding position of the guides during the said vertical movements.

6. A vehicle for travel on railroad rails including a vehicle frame, transverse axle means, spring means supporting the frame upon the axle means, vehicle wheels mounted on opposite ends of the axle means, rigid guide supporting levers having end portions and being pivotally supported on said axle means intermediate said end portions, lateral reaction guides carried by one end portion of said levers and having vertical flange portions, means including hydraulic cylinders and pistons therefor for rotating said levers about the axle means for raising the guides from and lowering them to normal operative guiding position with said flange portions extending adjacent above and below the top of the rail head but normally out of contact therewith, said hydraulic cylinders and pistons being disposed substantially horizontally and being pivotally connected to the frame and to the other end portions of said levers at spaced pivotal points and being operative to vary the spacing of said points when lowering the guides to said operative position, and means operative to prevent relative movement of the pistons and cylinders for unyieldably opposing rotation of said levers responsive to any lifting thrust exerted on the guides should the said flange portions be shifted laterally into engagement with the rail.

7. For combination with a vehicle having a vehicle frame, transverse axle means, spring means supporting the frame upon the axle means and resilient vehicle wheels mounted on opposite ends of the axle means, the improvement for adapting the vehicle for travel on railroad rails comprising rigid guide supporting levers having end portions and means for pivotally supporting said levers on said axle means intermediate said end portions and retained thereon against axial movement, lateral reaction guides carried by one end portion of said levers and having tread and vertical flange portions, guide control means pivotally connectible to said levers and to said frame at spaced apart pivotal points, means operative on said control means for varying the spacing of said pivotal points effective for rotating the levers to position the guides in guiding position with said tread portions spaced above the rail heads and the flange portions extending adjacent, above and below the rail heads but normally out of contact therewith and for rotating the levers to retract the guides from said guide position, and means rendering the control means effective when the guides are in guiding position to unyieldably oppose rotation of said levers responsive to a lifting thrust exerted on the guides should the flange portions be shifted laterally into engagement with the rails.

8. A vehicle for travel on railroad rails including a vehicle frame, transverse axle means, spring means supporting the frame upon the axle means, vehicle wheels mounted on opposite ends of the axle means, rigid guide supporting bell crank levers having end portions and being pivotally supported on said axle means intermediate said end portions and retained against axial movement, lateral reaction guides carried by one end portion of said levers and having flange and tread portions, means including hydraulic cylinders and pistons therefor for rotating said levers about the axle means for raising the guides from and lowering them to normal operative position with said tread portions spaced above the rail head and the flange portions adjacent and extending below the top of the rail head, said hydraulic cylinders and pistons being disposed substantially horizontally and being pivotally connected to the frame and to the other end portions of said lever at spaced pivotal points and being operative to vary the spacing of said points when lowering the guides to said operative position, means rendering the cylinder and piston effective to unyieldably oppose rotation of said levers responsive to any lifting thrust exerted on the guides, the path of travel of the pivotal connection between the frame and said guide control means during vertical movements of the frame relatively to the axle means being so positioned relatively to the said pivotal connections between the levers and control means and the levers and axle means as to cause the control means to control the rotative position of the levers to maintain substantially unchanged the guiding position of the guides during the said vertical movements.

9. For combination with a vehicle having a vehicle frame, transverse axle means, spring means supporting the frame upon the axle means and vehicle wheels mounted on opposite end portions of the axle means, the improvement for adapting the vehicle for travel on railroad rails comprising rigid guide supporting levers having downwardly and upwardly extending arms and pivotally supported on the axle means intermediate the extremities of said arms, lateral reaction guides carried by said downwardly extending arms and having guide flange and tread portions, guide control means for rotating said levers about the axle means for raising and for lowering the guides to maintain them at guide position with said tread portions spaced above the rail head and said flange portions adjacent and extending below the top of the rail head, said control means being pivotally connected to the frame and to said upwardly extending arms at spaced apart pivotal points and being operative to unyieldably oppose rotation of said levers responsive to any lifting thrust exerted upon said guides, vertical movements of said frame relatively to said axle means causing a corresponding vertical shifting of the pivotal connection between the control means and frame thereby causing the control means to control the rotative position of said levers to the extent necessary to maintain the guides in guide position at substantially a constant level relatively to the rail heads.

10. A vehicle for travel on railroad rails including a rigid frame, transverse axle means, spring means supporting the frame upon the axle means, flangeless vehicle wheels having resilient tires and supported on opposite ends of the axle means, rigid arms pivotally supported between their ends on said axle means, lateral reaction guide wheels carried by one end of said arms having vertical flange portions and rail tread portions, manually controlled means and guide control means operated by said manual controlled means adapted for rotating said arms relatively to said axle means for raising said guides to inoperative position and lowering them to operative guide position with said tread portions positioned slightly above the rail heads and the flange portions extending adjacent and below the top of the rail heads, said guide control means being pivotally connected to the frame and to the other end of said arms at spaced pivotal points and being operative to vary the spacing of said pivotal points when lowering the guides to operative position and to unyieldably oppose rotation of said levers responsive to any lifting thrust exerted on said guides, said guide control means being rendered automatically operative during vertical movements of said frame relatively to said axle means by the corresponding vertical shifting of the pivotal connection of said guide control means with the frame to effect rotation of said levers to the extent necessary to maintain the guide wheels in said guide position at substantially a constant level relatively to the rail heads.

11. A vehicle for travel on railroad rails including a vehicle frame, vehicle wheels, vehicle wheel supporting means, spring means supporting the frame upon the wheel supporting means, rigid levers pivotally retained on said wheel supporting means, lateral reaction guides carried by said levers, said guides having vertical flange portions, guide positioning means pivotally connected to said levers and to said vehicle frame at spaced apart points to position the guides with said flange portions extending adjacent to and above and below the rail heads but normally out of contact therewith, and being further effective to unyieldably oppose rotation of said levers responsive to lifting thrusts exerted on the guides should the guides be shifted laterally into engagement with the rail, said points being so located relative to one another and to the rigid lever pivot as to maintain the guides in substantially unchanged guide position relative to the rail during relative movements between the frame and wheel supporting means.

12. A vehicle for travel on railroad rails including a vehicle frame, vehicle wheels, vehicle wheel supporting means, leaf spring means shackled at one end to the frame and pivoted at its opposite end to the frame and intermediately connected to the wheel supporting means, a four bar guide suspension linkage consisting of a rigid lever pivotally retained on said wheel supporting means, guide control means pivotally connected to said lever and to said frame, the portion of said spring means extending between its frame pivot and said vehicle wheel supporting means, and the portion of the said vehicle frame between said guide control pivot connected to said frame and said spring pivot on said frame, lateral reaction guide means on said rigid lever, said guide means having vertical flange portions for suspension in guiding position adjacent to and above and below the rail heads, said guide suspenson linkage being effective to resist lifting components of thrust reactions exerted on the guides while in guiding position, and by coaction of the said four bars of the linkage being effective to utilize relative movement between said frame and said vehicle wheel supporting means to maintain substantially unchanged the guide position relative to the rail head.

HERBERT W. TEMPLETON.

References Cited in the file of this patent

UNITED STATES PATENTS

| Number | Name | Date |
|---|---|---|
| 1,262,966 | Mahon | Apr. 16, 1918 |
| 1,763,373 | Schnell | June 10, 1930 |
| 2,018,972 | Pollock et al. | Oct. 29, 1935 |
| 2,027,684 | Fageol | Jan. 14, 1936 |
| 2,140,421 | Fageol | Dec. 13, 1938 |
| 2,348,445 | Bayer | May 9, 1944 |

FOREIGN PATENTS

| Number | Country | Date |
|---|---|---|
| 28,024 of 1906 | Great Britain | Dec. 8, 1905 |